United States Patent [19]

Iwai et al.

[11] Patent Number: 5,044,710

[45] Date of Patent: Sep. 3, 1991

[54] LASER BEAM DEFLECTION APPARATUS

[75] Inventors: Junichi Iwai, Tokyo; Yasuaki Nakane, Miyagi; Hiroshi Nakayama; Shuichi Igarashi, both of Miyagi, all of Japan

[73] Assignee: Sony Corporation, Tokyo, Japan

[21] Appl. No.: 498,948

[22] Filed: Mar. 26, 1990

[30] Foreign Application Priority Data

Mar. 30, 1989 [JP] Japan ................................. 1-079944

[51] Int. Cl.⁵ ............................................ G02B 26/08
[52] U.S. Cl. ..................................... 359/217; 250/236; 359/205; 359/216
[58] Field of Search .......................... 350/6.8, 6.7, 6.5; 250/234, 235, 236

[56] References Cited

U.S. PATENT DOCUMENTS 3,813,140 5/1974 Knockeart ............................ 350/6.8
3,972,583 8/1976 Lobb ..................................... 350/6.8
4,429,948 2/1984 Garwin ................................. 350/6.8

Primary Examiner—Loha Ben
Attorney, Agent, or Firm—Philip M. Shaw, Jr.

[57] ABSTRACT

A laser beam deflection apparatus is comprised of a polygon mirror having a plurality of reflection surfaces, a laser beam incident on the reflection surfaces of the polygon mirror, and n number of reflection devices positioned in facing relation to the polygon mirror, and aligned in a rotational direction of the polygon mirror for reflecting the laser beam reflected from one of the reflection surfaces back towards the one of the reflection surfaces of the polygon mirror, whereby the laser beam is twice reflected by the one of the reflection surfaces and is deflected through a predetermined angle n times during each predetermined increment of rotation of the plurality of reflection surfaces of the polygon mirror.

10 Claims, 9 Drawing Sheets

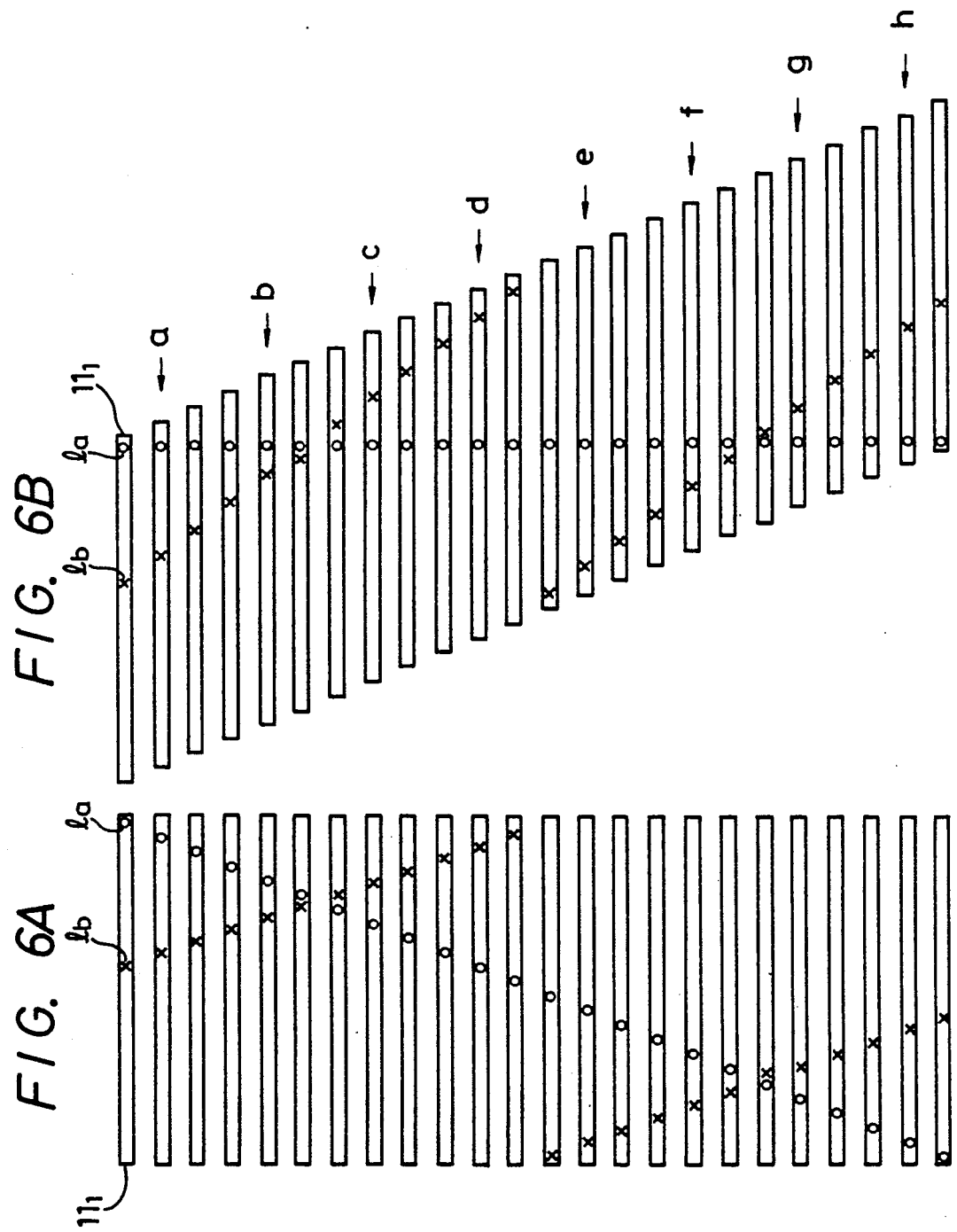

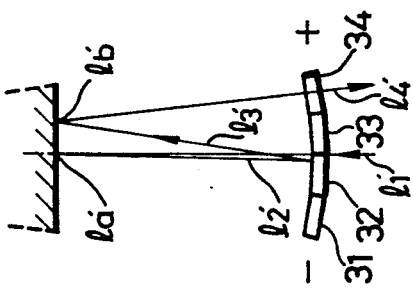
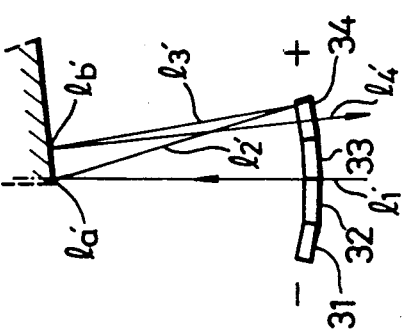
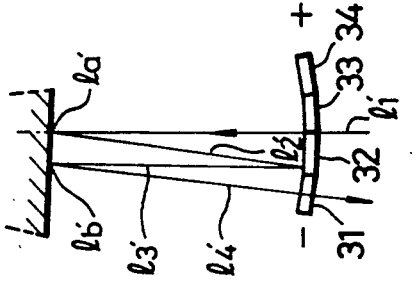
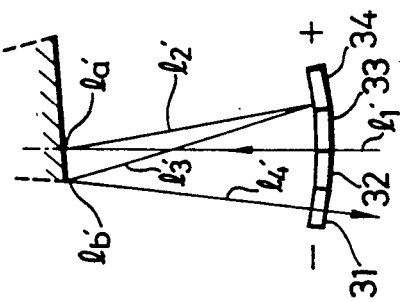
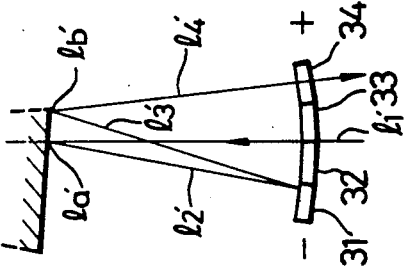
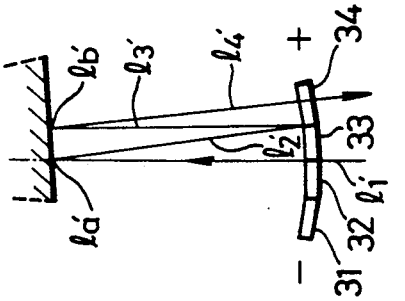
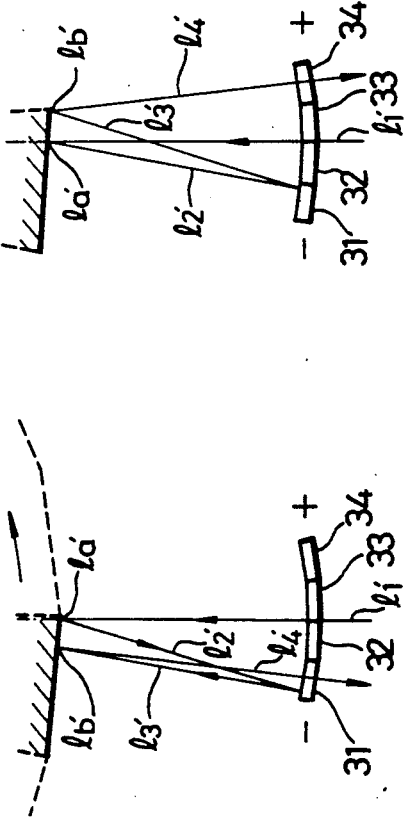
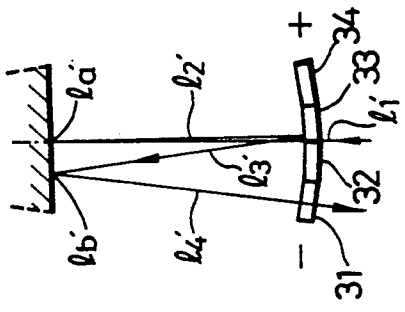

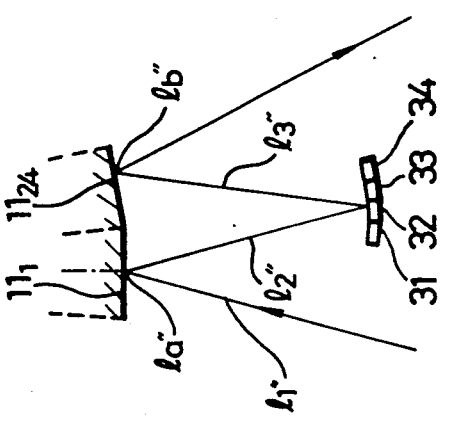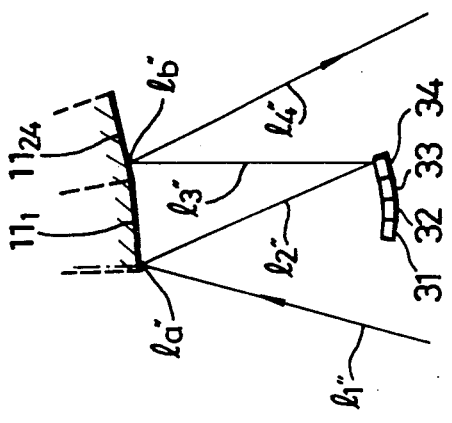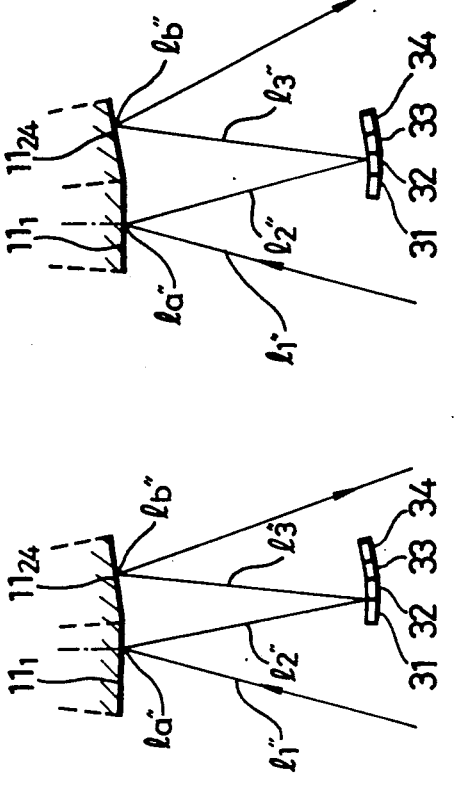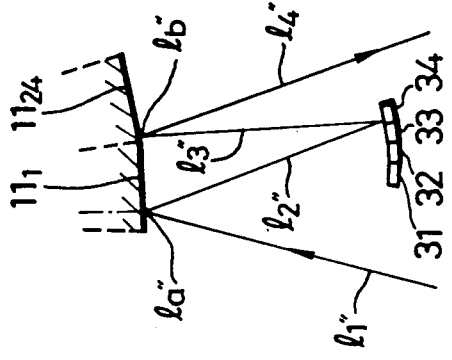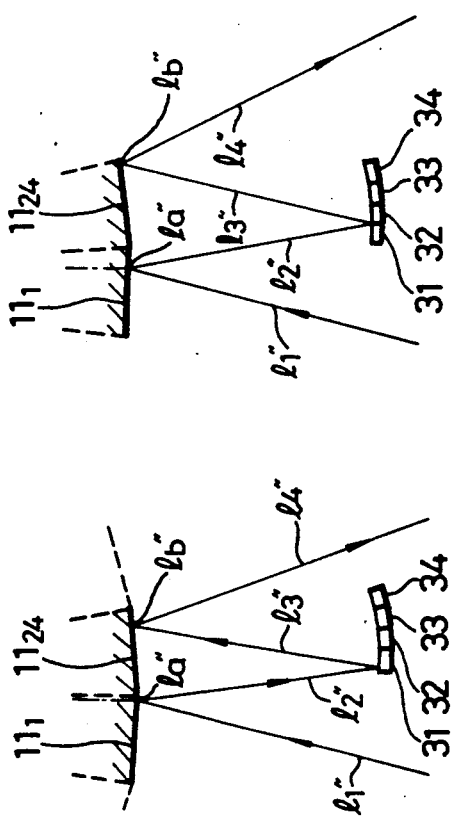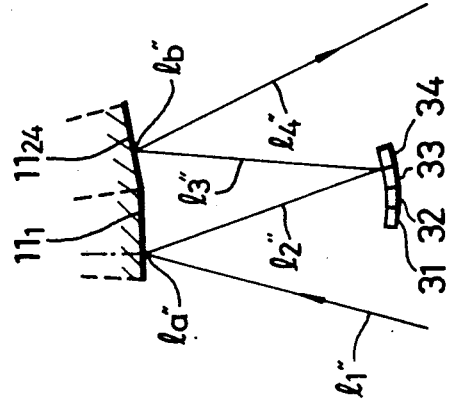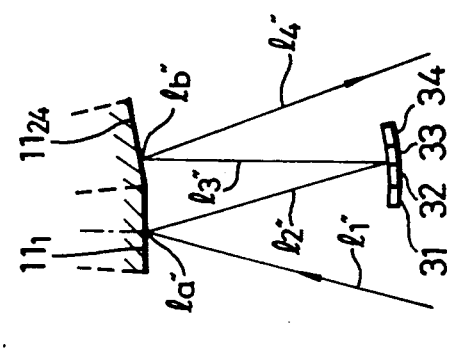

LASER BEAM DEFLECTION APPARATUS

BACKGROUND OF THE INVENTION

1. Field of the Invention

The present invention relates to a laser beam deflection apparatus for deflecting a picture drawing laser beam by utilizing a polygon mirror.

2. Description of the Prior Art

In order to understand the present invention more clearly, let us first explain a previously-proposed projection type video display apparatus using a laser beam which is described in Japanese Laid-Open Utility Model Gazette No. 56-152456 or The Journal of the Institute of Television Engineers of Japan, Vol. 29, No. 2, 1975. FIG. 1 shows an overall arrangement of such a previously-proposed video display apparatus of the projection type.

Referring to FIG. 1, there are provided laser light sources 1a and 1b which might be a semiconductor laser, a gas laser or the like. A red laser beam from the laser light source 1a is introduced into an optical modulator 2a. A green laser beam and a blue laser beam from the laser light source 1b are introduced into a dichroic mirror 3a, in which they are separated to provide a green laser beam and a blue laser beam. The green laser beam is introduced into an optical modulator 2b, whereas the blue laser beam is introduced through a reflection prism 4a to an optical modulator 2c. Modulation signals corresponding to three primary color signals, provided as a video signal of an image to be displayed, are supplied to the optical modulators 2a, 2b and 2c, respectively. The optical modulators 2a, 2b and 2c modulate in intensity (luminous intensity) the red, green and blue laser beams on the basis of the modulation signals. The laser beams from the optical modulators 2a, 2b and 2c are supplied to lenses 5a, 5b and 5c for adjusting the diameters of the laser beams, respectively. The blue laser beam from the lens 5c is introduced into a dichroic mirror 3b through a reflection prism 4b, and the green laser beam from the lens 5b is introduced into the other mirror face of the dichroic mirror 3b, whereby the blue and green laser beams are mixed. The laser beam thus mixed is introduced into a dichroic mirror 3c, and the red laser beam from the lens 5a is introduced into the other mirror face of the dichroic mirror 3c, whereby a mixed laser beam of three primary colors is obtained. The modulated, mixed laser beam is supplied to a reflection portion 11 of a rotating polygon mirror 10.

In the polygon mirror 10, the reflecting portion 11 is formed by arranging a plurality of flat mirrors with an equal spacing in an annular-fashion. This annular-shaped reflecting portion 11 is rotated at high speed by some suitable drive means such as a motor or the like. The flat mirrors forming the reflecting portion 11 of the polygon mirror 10 may be a regular icosipentahedron thereby to deflect a laser beam incident on each flat mirror. FIGS. 2A and 2B illustrate the deflected states of the laser beam.

As, for example, shown in FIG. 2A, when a laser beam $l_{in}$ becomes incident on an end portion of a flat mirror $11_1$ of the reflecting portion 11 by the rotation of the reflecting portion 11, a laser beam $l_{out}$ is reflected towards the lower portion of FIG. 2A. When the reflecting portion 11 is rotated, the angle at which the laser beam $l_{in}$ becomes incident on the flat mirror $11_1$ is gradually changed, thus changing the outgoing direction of the reflected laser beam $l_{out}$. As shown in FIG. 2B, when the reflecting portion 11 is rotated by an angle $\Theta_1$ to cause the laser beam $l_{in}$ to become incident on the other end portion of the flat mirror $11_1$, a reflected laser beam $l_{out}'$ is oriented towards the upper portion of FIG. 2B. In that event, an angle $\Theta_2$ formed by the laser beams $l_{out}$ and $l_{out}'$ becomes the deflection angle of the flat mirror $11_1$, i.e. the angle through which the laser beam is scanned as the reflecting portion 11 is rotated. This constitutes one "deflection cycle" of the rotating reflection portion 11. Other flat mirrors of the reflecting portion 11 deflect the laser beams by a similar deflection angle so that, when the reflecting portion 11 is composed of 25 flat mirrors, the laser beam is deflected through the angle $\Theta_2$ 25 times per revolution of the reflecting portion 11.

Turning back to FIG. 1, the laser beam reflected by the polygon mirror 10 is introduced through a projection lens 6 to a galvano mirror 7 which is controlled in rotation by a drive source 7a. When the galvano mirror 7 is rotated during a predetermined interval by the drive source 7a, the laser beam from the polygon mirror 10 is deflected through a predetermined deflection angle over a predetermined interval. In that case, the deflection direction by the polygon mirror 10 and the deflection direction by the galvano mirror 7 are selected to be at right angles to each other. The deflection by the polygon mirror 10 corresponds to the horizontal deflection in the television receiver, whereas the deflection by the galvano mirror 7 corresponds to the vertical deflection in the television receiver.

A laser beam reflected by the galvano mirror 7 is reflected by a reflection mirror 8 and is made incident on the rear surface of a flat screen 9. Upon use, the viewer can see an image, formed by the scanning laser beams, from the front surface side of the screen 9.

Horizontal and vertical scanning cycles of the video signal for forming the modulation signals supplied to the optical modulators 2a, 2b and 2c are synchronized with the deflection cycle of the polygon mirror 10 and the deflection cycle of the galvano mirror 7, whereby an image based on the video signal is displayed on the screen 9 by the raster-scanning of the laser beams. Therefore, an image of one field-time is displayed on the screen 9 during one field period of the video signal. Hence, the display apparatus of FIG. 1 is operated as a projection-type video display apparatus.

The operation of the thus arranged video display apparatus will be described next.

When a video signal, for example, of 1125 horizontal scanning lines, is displayed, the polygon mirror 10 having 25 flat mirrors must be rotated at 81000 r.p.m., which needs a special drive motor and a special bearing for effecting such high speed rotation. If the polygon mirror 10 is rotated at such high speed, then the flat mirrors of the polygon mirror will be moved at a high speed beyond the velocity of sound, which is not desirable from a video display apparatus safety standpoint.

In order to solve the above-described problems, it is proposed to decrease the rotation speed of the polygon mirror by increasing the number of the flat mirrors formed on the reflecting portion of the polygon mirror. This proposal is not advantageous in practice because of the following reasons:

If the rotating portion of the polygon mirror is increased in diameter, then a greater centrifugal force is applied to the reflecting portion of the polygon mirror, thereby producing an elastic strain on the mirror surface. As a result, the raster-scanning of the laser beam is disturbed and also a large torque motor is unavoidably needed, which is not practical. Further, if the number of the flat mirrors is increased without increasing the diameter of the rotating portion of the polygon mirror, then the area of one flat mirror will be decreased so that the deflection angle becomes very small from a laser beam and beam spot relationship standpoint, which is also not advantageous in practice.

An example of the aforementioned defect will be described hereinunder.

In the flat mirror formed on each plane of the polygon mirror having pentacontane reflection faces and a diameter of 40 cm, the width of each flat mirror becomes 2.5 cm. When a laser beam having a spot diameter of 1 mm becomes incident on the polygon mirror, if the laser beam becomes incident on both planes at the boundary portion of the two flat mirrors, then a so-called eclipse will occur. This eclipse makes respective end portions of each plane become invalid by 1 mm each, making 40% of each plane invalid. Therefore, only 60% of the plane can be effectively utilized, and hence the deflection angle becomes very small, which is not advantageous in practice.

Furthermore, if the beam diameter of the laser beam is reduced, then the resolution of the image to be displayed will be degraded. Accordingly, it is not possible to reduce the invalid period by reducing the beam diameter of the laser beam.

OBJECTS AND SUMMARY OF THE INVENTION

Therefore, it is an object of the present invention to provide an improved laser beam deflection apparatus which can eliminate the defects encountered with the prior art.

More specifically, it is an object of the present invention to provide an improved laser beam deflection apparatus in which the deflection number of the laser beam can be increased by a simplified arrangement.

It is another object of the present invention to provide a laser beam deflection apparatus in which the rotational speed of the polygon mirror for deflecting the laser beam can be decreased.

It is a further object of the present invention to provide a laser beam deflection apparatus in which the polygon mirror for deflecting the laser beam can be made compact in size.

It is still another object of the present invention to provide a laser beam deflection apparatus which is suitable in the application to a laser display apparatus.

In accordance with the invention there is provided a laser beam deflection apparatus of the type which includes:

(a) a rotatable polygon mirror having a plurality of reflection surfaces; and
(b) means for directing a laser beam to be incident on each of the reflection surfaces of the polygon mirror in turn as the polygon mirror rotates so that the laser beam is deflected through a predetermined angle during a predetermined increment of rotation ("deflection cycle") of the polygon mirror; wherein the improvement comprises:
(c) n number of reflection means positioned in facing relation to the polygon mirror, where n is a real integer, and aligned in the rotational direction of the polygon mirror for reflecting the laser beam reflected from one of the reflection surfaces back towards the one of the reflection surfaces of the polygon mirror, whereby the laser beam is twice reflected by the one of the reflection surfaces and is deflected through the predetermined angle n times for each deflection cycle of the polygon mirror.

The above, and other objects, features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

FIGS. 6A and 6B are schematic diagrams of the incident points of the laser beam, and to which reference will be made in explaining the operation of the first embodiment;

FIGS. 8A to 8H are schematic diagrams to which reference will be made in explaining the operation of the second embodiment;

FIGS. 10A to 10H are schematic diagrams to which reference will be made in explaining a modified example of the present invention.

DETAILED DESCRIPTION OF PREFERRED EMBODIMENTS

Figure 1:
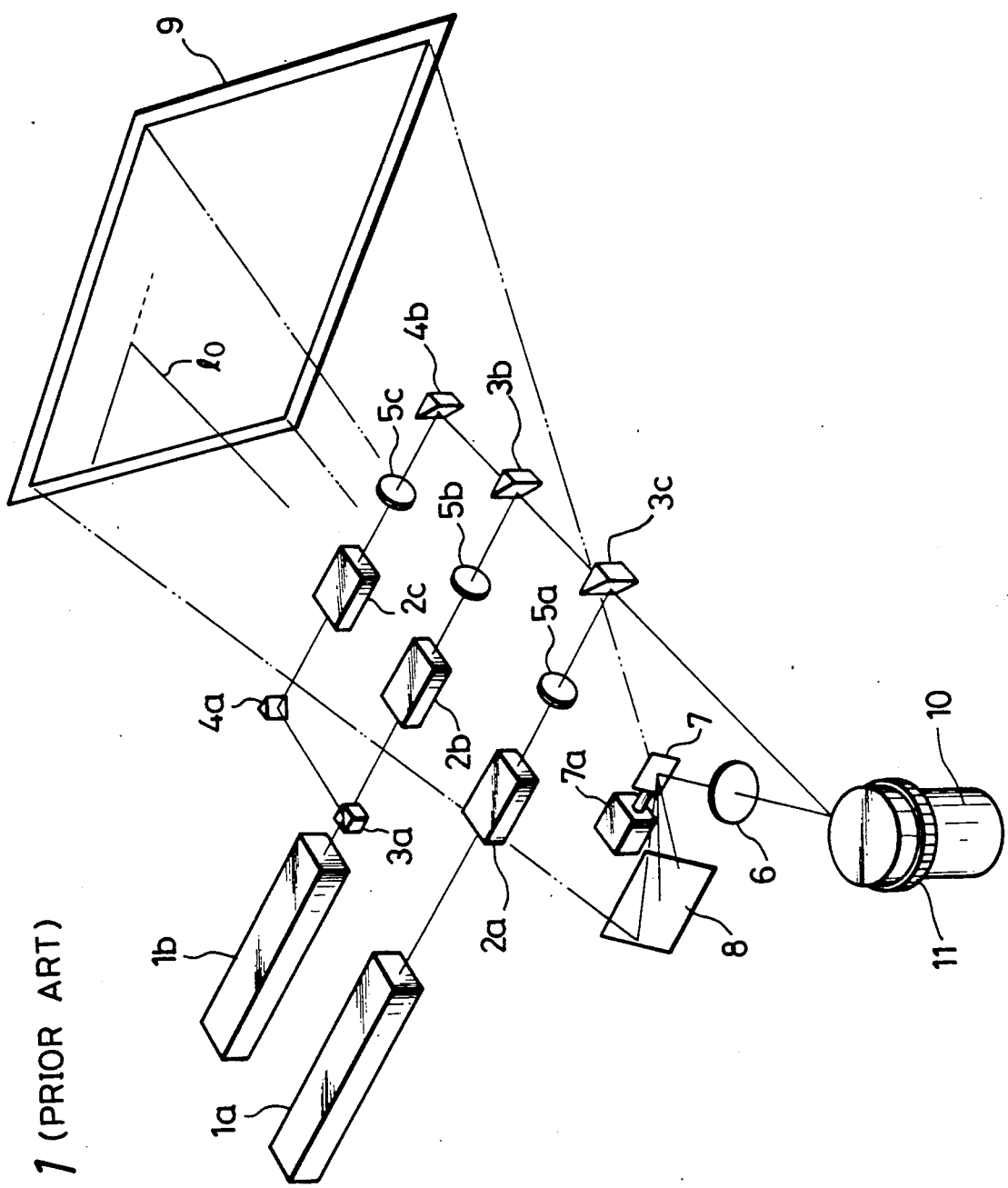
FIG. 1 is a perspective view illustrating an example of a prior-art video display apparatus of projection-type.
Figure 2A:
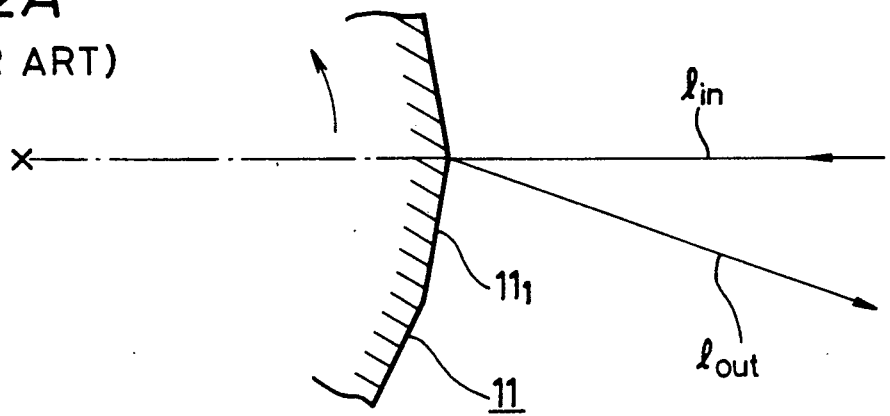
FIGS. 2A and 2B are schematic diagrams of a reflecting portion and laser beams of the device of FIG. 1, and to which reference will be made in explaining how the reflecting portion deflects the laser beams.
Figure 2B:
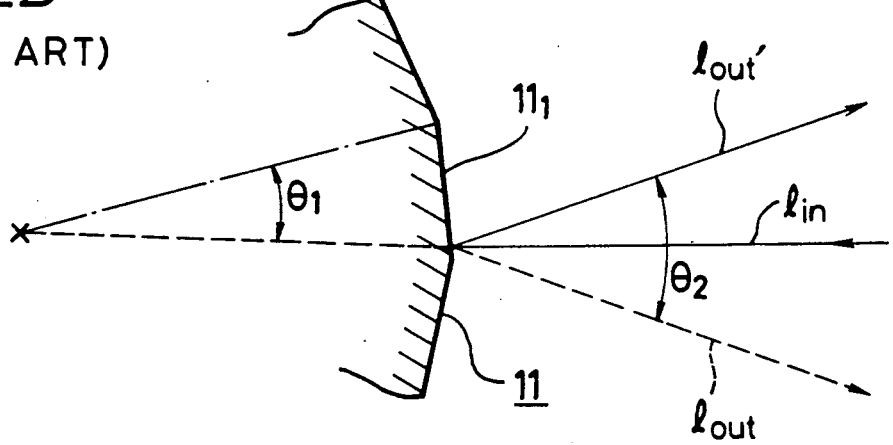

A first embodiment of a laser beam deflection apparatus according to the present invention will hereinafter be described with reference to FIGS. 3 to 6. Throughout FIGS. 3 to 6, like parts corresponding to those of FIGS. 1 and 2 are marked with the same references and therefore need not be described in detail.

Figure 3:
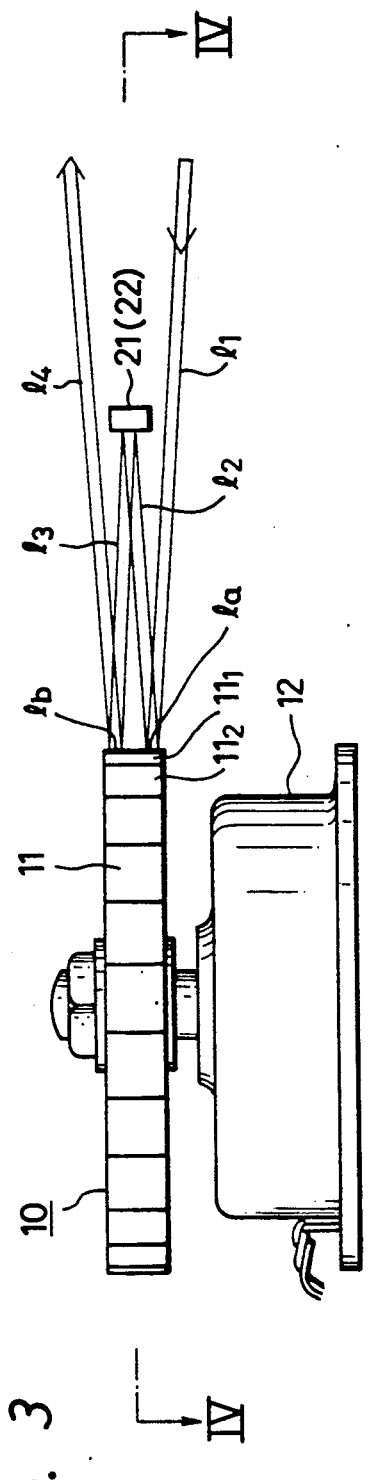
FIG. 3 is a front view illustrating a first embodiment of a laser beam deflection apparatus according to the present invention.
Figure 4:
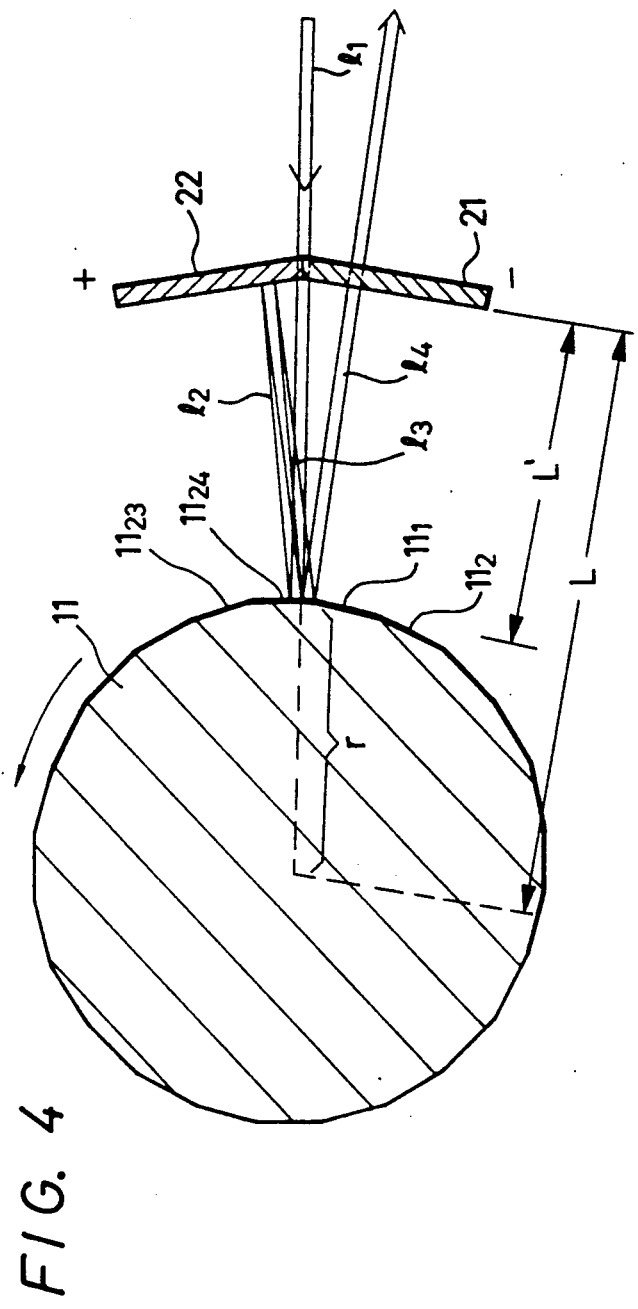
FIG. 4 is a diagrammatic view of a section taken through the line IV to IV of FIG. 3.

FIGS. 3 and 4 illustrate mainly the polygon mirror 10 of the laser beam deflection apparatus of this embodiment. The video display apparatus of this embodiment draws a visual image by the raster-scanning of the laser beam similarly to the prior-art laser display apparatus of the example of FIG. 1. FIG. 3 shows the main components of the laser beam deflection apparatus and other portions are constructed similarly to those of FIG. 1.

In FIG. 3, reference numeral 10 generally designates the rotating polygon mirror which is comprised of the reflecting portion 11 and a driving motor 12. The reflecting portion 11 is formed by arranging a regular tetracosane or 24 flat mirrors $11_1, 11_2, \ldots, 11_{24}$ with an equal spacing in an annular-fashion. The reflecting portion 11 is rotated in the direction indicated by the arrow in FIG. 4 by the driving motor 12.

In this embodiment, a laser beam $l_1$, modulated in intensity, is made incident on each of the respective flat mirrors $11_1$, $11_2$, ..., $11_{24}$, in turn, of the reflecting portion 11 from a direction slightly lower than the reflecting portion 11 and in a direction toward the rotational center of the polygon mirror 10. A reflected laser beam $l_2$ which is the incident laser beam $l_1$ reflected on the reflecting portion 11, is deflected through a deflection angle by each one of the flat mirrors $11_1$, $11_2$, ..., $11_{24}$ in accordance with the rotation of the reflecting portion 11. The point at which the laser beam becomes incident on the reflecting portion 11 assumes a primary incident point $l_a$. Two flat mirrors 21 and 22 are located at the position to which the reflected laser beam $l_2$ reaches. The respective flat mirrors 21 and 22 are located such that, as the reflecting portion 11 rotates in the direction indicated, if the deflected range of the reflected laser beam $l_2$ is divided by one-half then the reflected laser beam $l_2$ within one deflected range (one horizontal scan line) becomes incident on the flat mirror 21 whereas the reflected laser beam $l_1$ within the other deflected range (the next horizontal scan line) becomes incident on the other flat mirror 22.

In other words, the reflecting portion 11 of the polygon mirror 10 is formed of the 24 flat mirrors $11_1$, $11_2$, ..., $11_{24}$ as described above so that the angle through which the reflected laser beam $l_2$ is deflected at each of the flat mirrors $11_1$, $11_2$, ..., $11_{24}$ becomes 30 degrees. For a deflection angle of 30 degrees, the reflected laser beam $l_2$ in the first deflection range of 15 degrees is incident on the flat mirror 21, and the reflected laser beam $l_2$ in the remaining range of 15 degrees is incident on the other flat mirror 22. In that case, the direction in which the reflected laser beam $l_2$ is deflected towards the flat mirror 21 side assumes a minus (−) direction, whereas the direction in which the reflected laser beam $l_2$ is deflected towards the flat mirror 22 side assumes a plus (+) direction, taken with respect to the incident laser beam $l_1$. (See FIGS. 5A–5H).

A reflected laser beam $l_3$ of the laser beam $l_2$ incident on the flat mirrors 21 and 22 is again introduced onto the reflecting portion 11 of the polygon mirror 10. The point at which the laser beam $l_3$ is incident on the reflecting portion 11 of the polygon mirror 10 assumes a secondary incident point $l_b$. The mirrors are so arranged that normal lines extended perpendicularly from the center (incident point provided when the deflection angle is 7.5 degrees) of each of the reflecting surfaces of the flat mirrors 21 and 22 are convergent at the spot $l_b$ vertically aligned with the primary incident point $l_a$. More specifically, the respective flat mirrors 21 and 22 are located such that, when the incident laser beam $l_2$, which is deflected through the range of 15 degrees at each of the flat mirrors 21 and 22 is deflected at the intermediate deflection angle of 7.5 degrees from the start of incidence, the secondary incident point $l_b$ at which the reflected laser beam $l_3$ is introduced again into the reflecting portion 11 of the polygon mirror 10 is vertically aligned with the primary incident point $l_1$ as seen from the top of the polygon mirror 10 (state of FIG. 4).

A reflected laser beam $l_4$ reflected at the secondary incident point $l_b$ of the reflecting portion 11 of the polygon mirror 10 on the basis of the laser beam $l_3$ travels above the flat mirrors 21 and 22 and reaches the projection lens (see FIGS. 1 and 3).

The deflected condition of the laser beam incident on the polygon mirror 10 in this embodiment will be described with reference to FIGS. 5A to 5H and FIGS. 6A and 6B.

Initially, let us describe the deflected condition of the laser beam in which the flat mirrors 21 and 22 are not provided. In that case, the reflecting portion 11 of the polygon mirror 10 is formed of the 24 flat mirrors $11_1$ to $11_{24}$ so that, when the reflecting portion 11 is rotated by 15 degrees, the reflecting portion 11 is moved by the width of one of the flat mirrors $11_1$ to $11_{24}$. Accordingly, the laser beam $l_2$ reflected during the rotation of 15 degrees is deflected from the maximum minus (−) direction of 15 degrees towards the extreme positive (+) direction of 15 degrees. Therefore, the laser beam $l_2$ is deflected through a deflection angle of a total of 30 degrees by one of the flat mirrors $11_1$ to $11_{24}$.

Whereas, in the case of the example of the invention shown in FIG. 3, the flat mirrors 21 and 22 are provided so that the laser beam is introduced into the polygon mirror 10 one more time with a different incident angle. Consequently, the laser beam $l_4$ finally reflected from the reflecting portion 11 is deflected towards the ± directions by 15 degrees each, i.e., for a total of 30 degrees when the reflecting portion 11 is rotated by only 7.5 degrees. Therefore, when the reflecting portion 11 is rotated by a full rotational angle of 15 degrees corresponding to the width of one of the flat mirrors $11_1$ to $11_{24}$, the laser beam is deflected twice through the deflection angle of 30 degrees.

The condition of the laser beam during this time will be described. FIGS. 5A to 5H illustrate the changes occurring when the laser beam $l_1$ is incident, for example, on the flat mirror $11_1$ of the reflecting portion 11 during one deflection cycle.

Figure 5A:
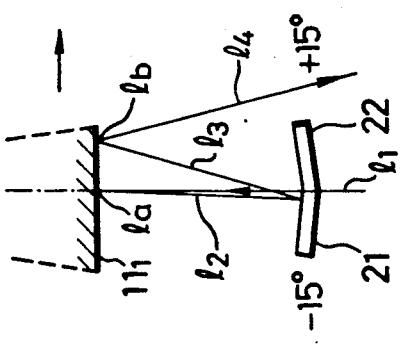
FIGS. 5A to 5H are schematic diagrams to which reference will be made in explaining the operation of the first embodiment.

As shown in FIG. 5A, when the primary incident point $l_a$ of the laser beam $l_1$ is located at one end portion of the flat mirror $11_1$, the reflected laser beam $l_2$ is deflected towards the − direction and the reflected laser beam $l_2$ is incident on the outer portion of the flat mirror 21. Further, the secondary incident point $l_b$ of the reflected laser beam $l_3$ from the flat mirror 21 is located at substantially the central portion of the flat mirror $11_1$. The reflected laser beam $l_4$ from the secondary incident point $l_b$ is deflected towards the − direction substantially parallel to the light path of the laser beam $l_2$.

Figure 5B:
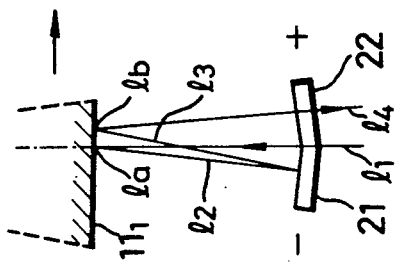
Figure 5C:
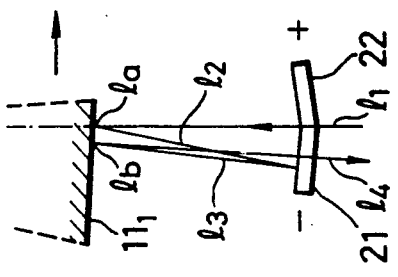
Figure 5D:
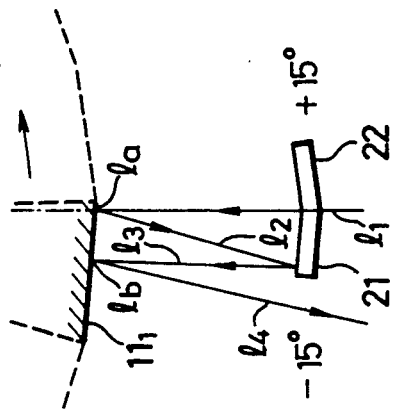

Under this condition, the reflected laser beam $l_4$ is sequentially deflected towards the + direction in accordance with the movement of the flat mirror $11_1$ due to the rotation of the polygon mirror 10 as shown in FIGS. 5B to 5D. In that case, as shown in FIG. 5D, when the primary incident point $l_a$ on the flat mirror $11_1$ is located at about the central portion of the flat mirror $11_1$ (i.e., when the deflection angle of the laser beam $l_2$ becomes approximately 7.5 degrees) the deflection angle of the reflected laser beam $l_4$ towards the + direction becomes maximum and the angle formed by the laser beam $l_2$ and the laser beam $l_4$ becomes about 15 degrees.

Figure 5E:
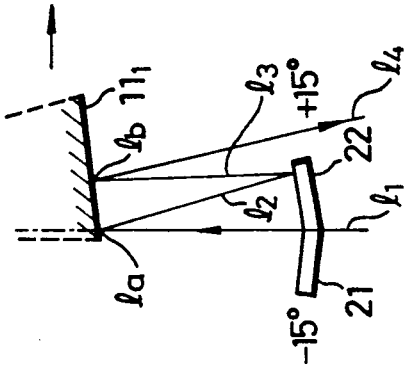
Figure 5F:
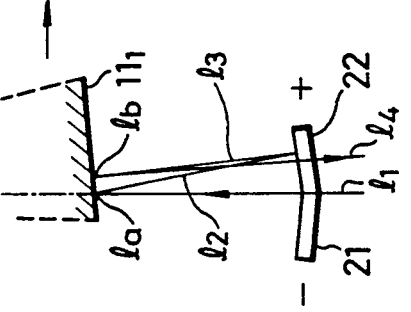
Figure 5G:
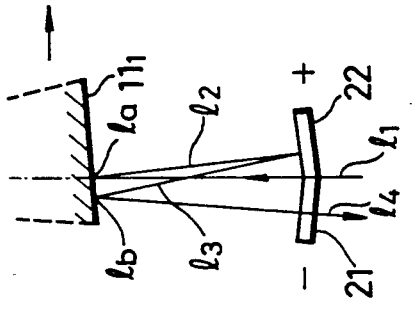
Figure 5H:
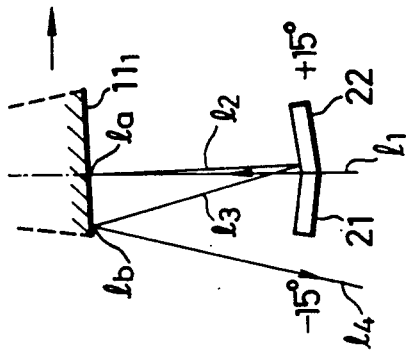

As shown in FIG. 5E, when the position of the primary incident point $l_a$ on the flat mirror $11_1$ has exceeded the central portion of the flat mirror $11_1$ so that the reflected laser beam $l_2$ is deflected towards the + direction, the laser beam $l_2$ is incident on the other flat mirror 22. At that time, the secondary incident point $l_b$ initially is located at the other end portion of the flat mirror $11_1$, whereby the reflected beam $l_4$ from the secondary incident point $l_b$ is abruptly deflected towards the − direction. The reflected laser beam $l_4$ is thereafter again sequentially deflected towards the + direction in accordance with the movement of the flat mirror $11_1$ due to the rotation of the polygon mirror 10 as shown in FIGS. 5F to 5H. In that case, as shown in FIG. 5H, when the primary incident point $l_a$ on the flat mirror $11_1$ is located at the other end portion of this flat mirror $11_1$, the deflection angle of the reflected laser beam $l_4$ towards the + direction becomes maximum and the laser beams $l_2$ and $l_4$ become substantially parallel to each other. As the rotating reflection portion 11 continues to rotate the laser beams $l_1$ to "becomes incident on a mirror", i.e. the text is not part of the subscript. $11_1$ and the cycle is repeated.

FIGS. 6A and 6B illustrate the conditions that the primary incident point $l_a$ and the secondary incident point $l_b$ on the flat mirror $11_1$ of the polygon mirror 10 are constantly changed. FIG. 6A shows the incident points where the flat mirror $11_1$ is fixed at a constant position, whereas FIG. 6B shows incident points where the primary incident point $l_a$ fixed at a constant position. In FIGS. 6A and 6B, an open circle represents the primary incident point $l_a$, and a cross mark represents the secondary incident point $l_b$. Further, in FIGS. 6A and 6B, the states of the flat mirror $11_1$ as shown by reference letters a to h indicate incident points corresponding to the incident states of FIGS. 5A to 5H, respectively. As shown in FIGS. 6A and 6B, the secondary incident point $l_b$ is changed under the condition that it is divided by one-half. It is thus to be understood that the deflection at the same deflection angle and in the same deflection range is performed twice by the single flat mirror $11_1$.

Let us now describe the conditions in which the deflection at the same deflection angle and in the same deflection range is performed at each flat mirror of the polygon mirror 10.

Assuming that n is the number of flat mirrors 21 and 22 provided in facing relation to the polygon mirror 10, and also assuming that r is the radius of an inscribed circle of the polygon mirror 10, then the maximum length L from the rotation center of the polygon mirror 10 to the flat mirrors 21 and 22 is expressed by the following equation (1)

$$L = (n + 5)\frac{r}{4} \quad (1)$$

In this embodiment, two flat mirrors 21 and 22 are provided and this yields n=2. Therefore, $L=7r/4$ is satisfied. Further, assuming that L' is the maximum distance from the surface of the reflecting portion 11 of the polygon mirror 10 to the flat mirrors 21 and 22, then this maximum length L' is expressed by the following equation (2)

$$L' = (n + 1)\frac{r}{4} \quad (2)$$

If the flat mirrors 21 and 22 are located at the positions in which the above-described equation (1) or (2) is satisfied, then the laser beam is deflected twice.

According to the display apparatus using the laser beam deflection apparatus of this embodiment, when the rotational speed of the polygon mirror 10 is selected to be the same as that of the prior art, the laser beam is deflected twice at the same deflection angle. Accordingly, if the deflection number is the same as that of the prior art, then the rotational speed of the polygon mirror 10 can be decreased. Therefore, the special motor, the bearing and the like for rotating the polygon mirror 10 at a very high speed are not needed. In that case, according to this embodiment, only two flat mirrors 21 and 22 are provided so that the laser beam deflection apparatus of this invention can be simplified in arrangement. Furthermore, if the rotational speed of the polygon mirror 10 is selected to be the same as that of the prior art, the number of flat mirrors can be reduced, whereby the diameter of the reflecting portion 11 of the polygon mirror 10 can be reduced or the width of each of the flat mirrors $11_1$ to $11_{24}$ can be increased.

A second embodiment of the laser beam deflection apparatus according to the present invention will be described with reference to FIGS. 7 to 10. In this embodiment, similarly to the first embodiment of FIG. 3, the laser beam deflection apparatus of the present invention is applied to the video laser display apparatus.

Figure 7:
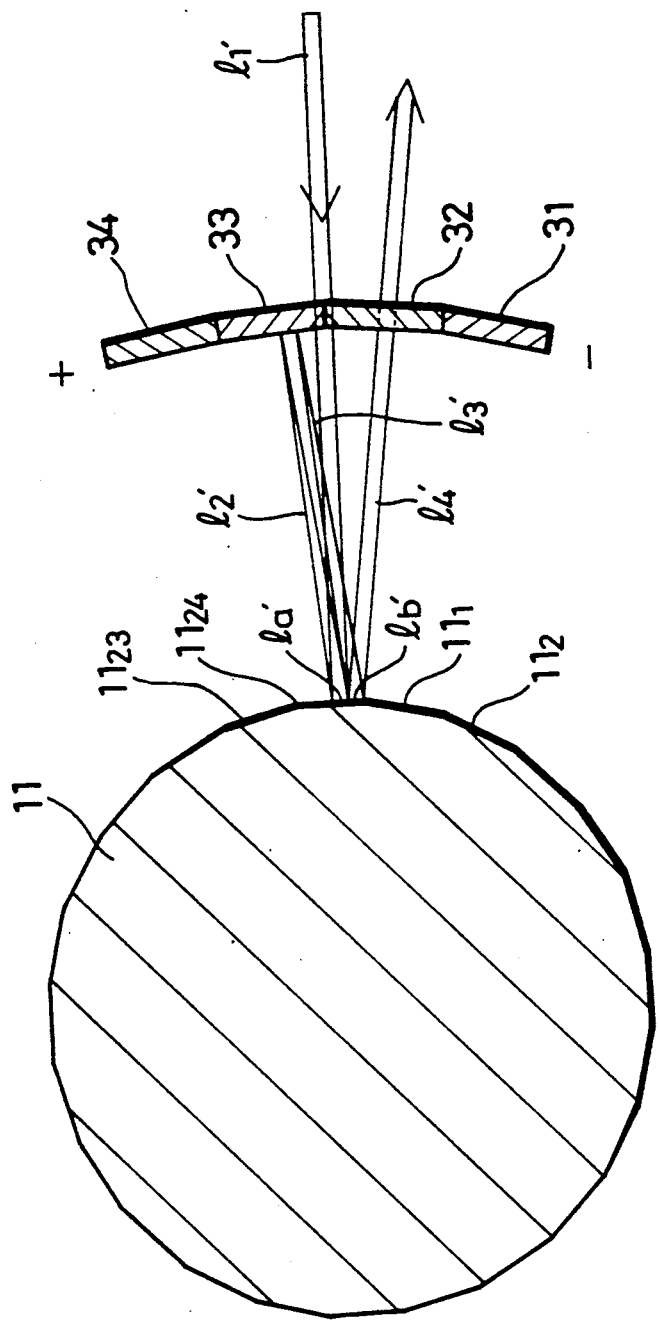
FIG. 7 is a diagrammatic view of a section of a second embodiment of a laser beam deflection apparatus according to the present invention.

In this embodiment, a laser beam is deflected four times each time the flat mirrors $11_1$ to $11_{24}$ of the polygon mirror 10 are rotated by the same amount. Similarly to the first embodiment of FIG. 3, a laser beam $l_1'$, modulated in intensity, is made incident on an incident point $l_1'$ of each of the flat mirrors $11_1$ to $11_{24}$ of the reflecting portion 11 with a very small upward inclination angle. As shown in FIG. 7 four flat mirrors 31, 32, 33 and 34 are located at the positions to which the reflected laser beam $l_2'$, which is the incident laser beam $l_1'$ reflected by the reflecting portion 11, reaches. These flat mirrors 31, 32, 33 and 34 are located such that, when the deflection range of the reflected laser beam $l_2'$ is divided equally by four, the reflected laser beam $l_2'$ within the deflection range nearest to the − direction is incident on the first flat mirror 31, the reflected laser beam $l_2'$ within the adjacent deflection range is incident on the second flat mirror 32, the reflected laser beam $l_2'$ within the adjacent deflection range is incident on the third flat mirror 33 and the reflected laser beam $l_2'$ within the deflection range nearest to the + direction is incident on the fourth flat mirror 34.

More specifically, the reflecting portion 11 of the polygon mirror 10 is formed of the 24 flat mirrors $11_1$, $11_2$, ... $11_{24}$ so that the angle through which the reflected laser beam $l_2'$ is deflected at each of the flat mirrors, $11_1$, $11_2$, ... $11_{24}$ becomes 30 degrees. For an over all deflection angle of 30 degrees, the reflected laser beam $l_2'$ is introduced into a different flat mirror 31, 32, 33 and 34 at every 7.5 degrees of rotation.

A reflected laser beam $l_3'$ of the laser beam $l_2'$ incident on each of the flat mirrors 31 to 34 is made incident on the reflecting portion 11 of the polygon mirror 10 one more time. The point at which the laser beam $l_3'$ is incident on the reflecting portion 11 is assumed to be a secondary incident point $l_b$. In that case, the flat mirrors 31 to 34 are located such that, when the incident laser beam $l_2'$ is deflected in the deflection range of 7.5 degrees and each of the flat mirrors 31 to 34 is given an intermediate deflection angle of 3.75 degrees from the start of incidence, the secondary incident point $l_b'$ at which the reflected laser beam $l_3'$ again is incident on the reflecting portion Il of the polygon mirror 10 is vertically aligned with the primary incident point $l_a'$, i.e. when the polygon mirror 10 is viewed from above.

A laser beam $l_4'$ reflected from the secondary incident point $l_b'$ of the reflecting portion 11 of the polygon or 10 on the basis of the laser beam $l_2'$ travels above the flat mirrors 31 to 34 and is supplied to the projection lens (see FIG. 1).

The deflected conditions of the laser beams incident on the polygon mirror 10 of the second embodiment will be described next with reference to FIGS. 8A to 8H and FIGS. 9A and 9B.

In this embodiment, there are provided four flat mirrors 31 to 34 so that the deflection is performed four times when the reflecting portion 11 is rotated by a rotational angle of 15 degrees corresponding to the width of one of the flat mirrors $11_1$ to $11_{24}$ of the polygon mirror 10. In this embodiment, however, each deflection angle is reduced to one-half of that of the first embodiment of the invention, i.e., 1·5 degrees. FIGS. 8A to 8H show the deflected conditions of the laser beams.

As shown in FIG. 8A, when the primary incident point $l_a'$ of the laser beam $l_1'$ is located at one end portion of the flat mirror $11_1$, the reflected laser beam $l_2'$ is deflected towards the − direction so that the reflected laser beam $l_2'$ is incident on the outer end portion of the first flat mirror 31. Further, the secondary incident point $l_b'$ of the reflected laser beam "$l_3'$" from this flat mirror 31 is located at an intermediate portion between one end portion and the center of the flat mirror $11_1$. Then, the reflected laser beam $l_4'$ at the secondary incident point $l_b'$ is deflected towards the − direction and is then emitted therefrom. Under this condition, in accordance with the movement of the flat mirror 11 due to the rotation of the polygon mirror 10, the reflected laser beam $l_4'$ is sequentially deflected towards the + direction as shown in FIG. 8B. This completes sweep of the laser bean $l_4'$.

When the reflected laser beam $l_2'$ is incident on the second flat mirror 32 as shown in FIG. 8C, the reflected laser beam $l_4'$ from the secondary incident point $l_b'$ is again deflected towards the − direction, whereby the reflected laser beam 24 is sequentially deflected towards the + direction in accordance with the rotation of the polygon mirror 10 as shown in FIG. 8D to complete another sweep of the laser bean $l_4'$.

In the same fashion, as shown in FIGS. 8E to 8H, each time the polygon mirror 10 is rotated by a rotational angle of 7.5 degrees, the reflected laser beam $l_2'$ is incident on the other flat mirrors 33 and 34, whereby the reflected laser beam $l_4'$ is deflected through 15 degrees by each mirror.

Figure 9B:
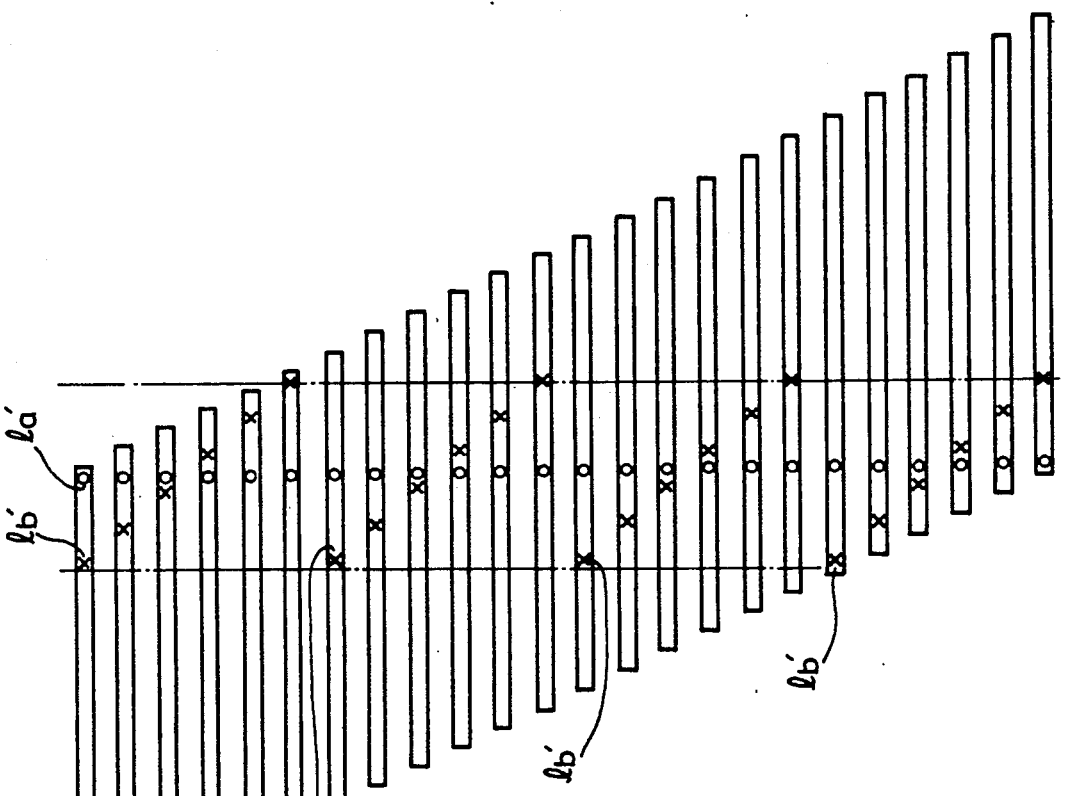
FIGS. 9A and 9B are schematic diagrams of the incident points of the laser beam, and to which reference will be made in explaining the operation of the second embodiment.
Figure 9A:
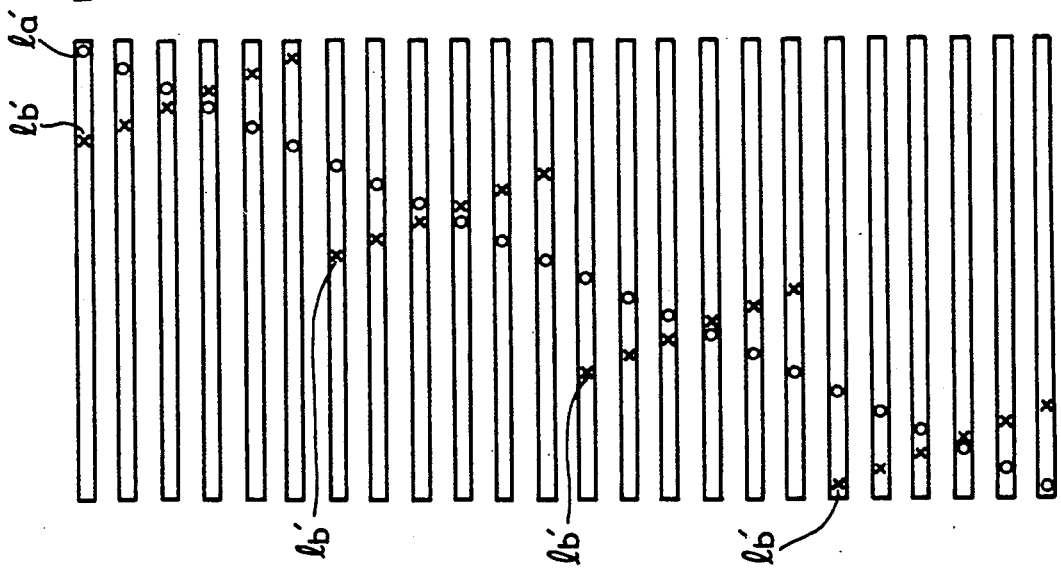

FIGS. 9A and 9B illustrate the conditions that the primary incident point $l_a'$ and the secondary incident point $l_b'$ on the flat mirror $11_1$ of the polygon mirror 10 are changed at constant times. FIG. 9A shows incident points where the flat mirror $11_1$ is fixed at a constant position, whereas FIG. 9B shows incident points where the primary incident point $l_a'$ is fixed at a constant position. In FIGS. 9A and 9B, an open circle represents the primary incident point $l_a'$ and a cross mark represents the secondary incident point $l_b'$. As shown in FIGS. 9A and 9B, the secondary incident point $l_b'$ is changed under the condition that it is divided equally by four. Therefore, the laser beam is deflected four times through the same deflection angle and in the same deflection range by one flat mirror $11_1$. In that point $l_a'$, is located at a constant position, the secondary incident point $l_b'$ falls within the same range shown by a one-dot chain line.

In the case of the second embodiment shown in FIG. 7, in order that the laser beam is deflected on each mirror surface of the polygon mirror 10 at the same deflection angle and in the same deflection range, the aforementioned equations (1) and (2) must be satisfied. In other words, in the second embodiment of the present invention, since there are provided four flat mirrors 31 to 34, a maximum length L from the rotation center of the polygon mirror 10 to the flat mirrors 31 to 34 is represented as $L=(9/4)r$.

As set out above, according to the arrangement of the second embodiment, the number of deflections is increased by four times so that the rotational speed of the polygon mirror 10 can be decreased and that the number of mirror surfaces of the polygon mirror 10 can be decreased. The total of four deflection angles at which the laser beams are deflected in the flat mirrors $11_1$ to $11_{24}$ of the polygon mirror 10 is 60 degrees similarly to the first example of FIG. 3. Accordingly, one deflection angle becomes 15 degrees, which is one-half of that of the first embodiment of FIG. 3.

While the laser beams $l_1$ and $l_1'$ incident on the polygon mirror 10 are made incident in the rotation center direction of the polygon mirror 10 in the above-described embodiment, the laser beam $l_1''$ may become incident on the polygon mirror 10 with a small inclination angle in the lateral direction as shown in FIGS. 10A to 10H. In that case, normal lines extended from the centers (i.e., incident points of the laser beam $l_2''$ when the deflection angle is 3.75 degrees) of the flat mirrors 31 to 34 are converged at a predetermined point which is slightly distant from the primary incident point "$l_a'''$" whereby a laser beam $l_2''$ reflected on each of the flat mirrors 31 to 34 is incident on an adjacent mirror surface (if the primary incident point $l_a''$ is located on the flat mirror $11_1$, then the secondary incident point $l_b''$ is located on the flat mirror $11_{24}$). With the thus made arrangement, as shown in FIGS. 10A to 10H, the reflected laser beam $l_4''$ from the secondary incident point $l_b''$ is deflected in accordance with the rotation of the polygon mirror 10 similarly to the second embodiment of FIG. 7. Further, the deflection direction of the reflected laser beam $l_4''$ can be changed from that of the second embodiment of FIG. 7.

While in the above-described embodiment the laser beam deflection apparatus of the present invention is applied to a laser display apparatus in which the laser beam modulated in intensity on the basis of the video signal is displayed on the screen, the laser beam deflection apparatus of the invention can be applied to various apparatus in which a laser beam is deflected by utilizing a polygon mirror. For example, the present invention can be applied to a so-called laser printer in which a laser beam, modulated in intensity on the basis of a visual image to be displayed, is deflected by a polygon mirror and is irradiated on a developing drum.

As set forth above, according to the present invention, the number of deflections can be increased by the simplified arrangement in which only the flat mirrors are provided, whereby the rotational speed of the polygon mirror for deflecting the laser beam can be decreased and also the polygon mirror can be made compact in size.

Having described preferred embodiments of the invention with reference to the accompanying drawings, it is to be understood that the invention is not limited to those precise embodiments of the invention and that various changes and modifications could be effected by one skilled in the art without departing from the spirit or scope of the invention as defined in the appended claims.

We claim as our invention

1. A laser beam deflection apparatus comprising:

a rotatable polygon mirror having a plurality of reflection surfaces;

means for directing a laser beam to be incident on each of the reflection surfaces of the polygon mirror in turn as the polygon mirror rotates so that the laser beam is deflected through a predetermined angle during a predetermined increment of rotation ("deflection cycle") of the polygon mirror;

a plurality n of flat mirrors which are positioned in facing relation to the polygon mirror and aligned with respect to the polygon mirror such that hypothetical normal lines passing through the center of each of the flat mirrors converge at the same point on one of the reflection surfaces of the polygon mirror and such that the deflected laser beam is consecutively reflected by each of the n flat mirrors during each deflection cycle of the polygon mirror, for reflecting the laser beam reflected from one of the reflection surfaces back towards said one of the reflection surfaces of the polygon mirror, whereby the laser beam is twice reflected by said one of the reflection surfaces and is deflected through the predetermined angle n times for each deflection cycle of the polygon mirror.

2. A laser beam deflection apparatus as recited in claim 1, wherein the polygon mirror is rotatable about a center of rotation and a hypothetical inscribed circle of the polygon mirror has a radius r and the maximum length L from the center of rotation of the polygon mirror to the flat mirrors of the reflection means is determined by:

$$L = (n + 5)\frac{r}{4}$$

3. A laser beam deflection apparatus as recited in claim 1, wherein n equals 2, and the incident laser beam is deflected twice during each deflection cycle of the polygon mirror.

4. A laser beam deflection apparatus as recited in claim 3, wherein the reflection means comprises two flat mirrors which are aligned with respect to the polygon mirror such that hypothetical normal lines passing through the center of each of the flat mirrors converge at the same point on one of the reflection surfaces of the polygon mirror.

5. A laser beam deflection apparatus as recited in claim 1, wherein n equals 4, and the incident laser beam is deflected four times during each deflection cycle of the polygon mirror.

6. A laser beam deflection apparatus comprising;
   (a) a rotatable polygon mirror having a plurality of reflection surfaces;
   (b) means for directing a laser beam to be incident on each of the reflection surfaces of the polygon mirror in turn as the polygon mirror rotates so that the laser beam is deflected through a predetermined angle during a predetermined increment of rotation ("deflection cycle") of the polygon mirror; and
   (c) a plurality n of flat mirrors which are positioned in facing relation to the polygon mirror, and aligned with respect to the polygon mirror such that hypothetical normal lines passing through the center of each of the flat mirrors converge at the same point on one of the reflection surfaces of the polygon mirror, for reflecting the laser beam reflected from one of the reflection surfaces back towards said one of the reflection surfaces of the polygon mirror, whereby the laser beam is twice reflected by said one of the reflection surfaces and is deflected through the predetermined angle n times for each deflection cycle of the polygon mirror.

7. A laser beam deflection apparatus as recited in claim 6, wherein the polygon mirror is rotatable about a center of rotation and a hypothetical inscribed circle of the polygon mirror has a radius r and the maximum length L from the center of rotation of the polygon mirror to the flat mirror of the reflection means is determined by:

$$L = (n + 5)\frac{r}{4}$$

8. A laser beam deflection apparatus as recited in claim 6, wherein the laser beam which is deflected by one of the reflection surfaces of the polygon mirror is consecutively reflected by each of the number n of the reflection means during each deflection cycle of the polygon mirror.

9. A laser beam deflection apparatus as recited in claim 8, wherein n equals 2, and the incident laser beam is deflected twice during each deflection cycle of the polygon mirror.

10. A laser beam deflection apparatus as recited in claim 6, wherein n equals 2, and the incident laser beam is deflected twice during each deflection cycle of the polygon mirror.

* * * * *